Patented May 19, 1953

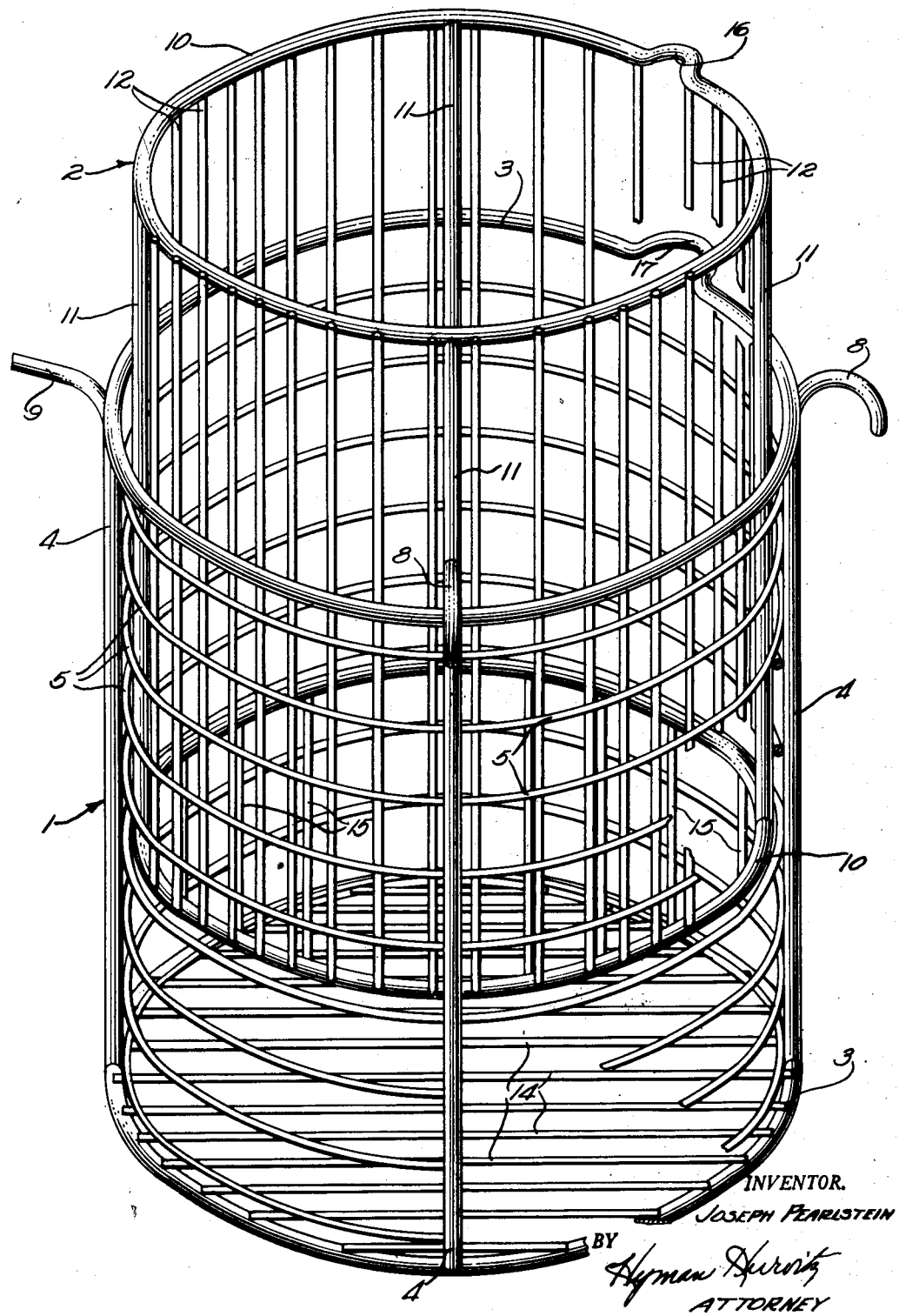

2,639,035

UNITED STATES PATENT OFFICE 2,639,035

SIFTING AND STRAINING DEVICE

Joseph Pearlstein, Arlington, Va.

Application October 22, 1947, Serial No. 781,376

1 Claim. (Cl. 210—169)

This invention relates generally to sifters and strainers, and more particularly to devices of this character which are readily cleanable, after completion of a sifting or straining operation.

It is a primary object of the invention to provide a strainer fabricated of two complementary units, which together form a unitary straining or sifting mechanism, the units being separable, and each unit, when separated from its complementary unit, being readily susceptible of thorough and rapid cleaning.

It is an ancillary object of the invention to provide an apparatus utilizable for straining and sifting, which shall be rugged of construction, and economical of fabrication.

It is a further object of the invention to provide a novel straining and sifting apparatus which is particularly adaptable for utilization in the household.

Straining and sifting apparatus as constructed and utilized heretofore uniformly possess, so far as I am aware, one fundamental defect which reduces the utility of such apparatus enormously, especially for household use. This disadvantage derives from the fact that such prior straining and sifting apparatus are difficult to clean, after use, by reason of the wire mesh construction normally utilized therein. This is particularly true in apparatus having small meshes, or perforations, and wherein the apparatus is utilized for straining liquid from a mixture of solids and liquid, the solids becoming entwined with the meshes, and lodging in the corners and crossovers formed by the intersection of the wires forming the meshes, since, the wires being normally of circular cross-section, sharp angles are provided at the meeting points of the peripheries of the wires, which act as traps for the material.

The process of cleaning the wire mesh sieves and strainers of the prior art has usually demanded the strenuous application of a cleaning brush, and considerable care, which at best does not dislodge all the food particles from the wire mesh, and which, aside from aesthetic considerations, encourages the growth of bacteria and other harmful organisms on the mesh.

My invention, on the other hand, involves the provision of a strainer or sieve constructed of two complementary units, which together form a mesh structure entirely similar to the structures of the prior art, each of the units, however, being per se formed with substantially no crossing wires, or the like, so that, after utilization, the units may be separated and separately cleaned with great ease, as by rinsing and/or wiping with a cloth.

I accomplish the objective of my invention by providing two complementary straining or sifting units, which may be of any desired shape or conformation, but which, for the sake of example, I shall disclose and illustrate as cylindrical. Each of the units is built upon the basis of a strong frame, of generally cylindrical configuration, and one of which is suitably dimensioned to fit snugly within the other. Secured to the frames I provide cross members, which may be of plastic or metal, or the like, and which may be of any desired cross-sectional shape. For the sake of simplicity of illustration merely, I have chosen to exemplify the cross members as fabricated of cylindrical wire.

Each of the units is open at one end, the remaining end being formed by a plurality of parallel wire rods, and the cylindrical surface of each of the units being formed of further wire rods, which, in one of the units run lengthwise of the cylinder, and which, in the other unit run peripherally of the cylinder. The wires forming the separate units, then, when assembled in complementary relation, one within the other, and when properly oriented, form rectangular meshes in both the cylindrical surface and the wired end of the apparatus.

The apparatus, when assembled, may be utilized for sifting or straining, in conventional fashion, and after the sifting or straining operation has been completed, the units forming the apparatus may be separated and separately cleaned, the latter being an operation readily performed, since the separate units are substantially mesh-less, and involve substantially no wire cross-overs.

A particular and preferred embodiment of the invention is described hereinafter, in detail, in conjunction with the accompanying drawings, wherein the single figure is a view in perspective of the separate units, partly in conjoint and complementary relation.

Referring now particularly to the drawings, the reference numeral 1 denotes generally the outer of a pair of complementary units, comprising together, the sifting and straining unit comprising the present invention, the reference numeral 2 denoting the inner unit of the pair.

The unit 1 comprises a pair of rings 3, formed of relatively heavy wire, or the like, and arranged co-axially in parallel planes. The rings 3 are spaced by a plurality of linearly extending ring supporting wires, fabricated of relatively heavy wire, and each of which is joined at its remote ends to the rings 3 respectively, holding the rings in rigid relation, and forming together with the rings 3 a cylindrical frame for the unit 1. For purposes of example only, I have shown a total of four supporting wires 4, but it will be understood that more or less than four may be utilized depending upon the desired size of the strainer and upon the strenuousness of the use intended therefor.

A plurality of circular fine wires 5, forming the primary straining or sifting elements of the unit 1, are secured to the linear elements 4, separated in equally spaced increments, and extending each parallel to the rings 3. The circular fine wires 5 are secured to the linear elements 4 at the internal surfaces of the former, the linear elements 4 thus being located externally of the cylinder formed by the fine wire circular elements 5. The linear supporting elements 4, on the other hand, are secured to the base ring 3 of the unit 1 in abutting relation to the said ring 3, and are secured to the upper ring 3 in line abutting relation thereto. One or more of the elements 4 may be bent to form hooks 8, from which the strainer or sifter may be suspended, in use, and one of the elements 4 may be extended, as at 9, to provide a handle for the device.

By securing the elements 4 to the upper ring 3, in abutting relation to the upper ring 3, the inner surface of the upper ring 3 may be positioned parallelly with the inner surfaces of the fine wires 5, so that these inner surfaces lie all interiorly of the surface of a uniform, right, circular cylinder, formed by the innermost elements of the linear supporting elements 4.

Turning now to the inner unit 2, the latter may be constructed of a pair of rings 10 which may be fabricated of heavy wire and which may have an outer diameter slightly smaller than the inner diameter of the rings 3 of unit 1. The rings 10 may be arranged in co-axial relation, and in parallel planes, and spaced by the rods 11, fabricated of relatively heavy wire similar to the rods or elements 4. It may be understood that any desired number of rods 11 may be utilized, although I have shown a total of four, for purposes of example. The rods 11 may be butt welded, or soldered, at their ends, to the under surface of the upper ring 10 and to the upper surface of the lower ring 10, and fine sifting or straining wires 12 may be secured, also as by welding or soldering, to the outer periphery of the rings 10, oriented in parallel to the rods 11, and having mutual spacings substantially equal to those of the circular wires 5. By virtue of this construction, the cylinder formed by the wires 12 is of slightly greater outer diameter than that formed by the rings 10 and the rods 11, and the first mentioned diameter is arranged to be of substantially the same size as the inner diameter formed by the rings 5, so that upon placing the units 1 and 2 in complementary relation, one inside the other, a snug fit is assured with the wires 12 in touch with the rings 5 at every point of cross-over in the cylinder.

The unit 1 is further provided with linear base wires 14, secured to the upper surface of the lower ring 3, the wires 14 being laid in parallel and with the same spacings and diameters as those of the rings 5.

The base of unit 2, on the other hand, is provided with linear elements 15, similar in spacing and construction to the elements 14, but secured to the under side of the lower ring 10 of unit 2. Units 1 and 2 are made of such heights that when unit 2 is inserted in unit 1, the upper rings 10 and 3 of the respective units are in substantially the same plane.

Since the elements 14 are secured to the upper side of lower ring 3 and the elements 15 to the under side of lower ring 10, the elements 14 and 15, if oriented in mutually perpendicular directions, contact to form rectangular meshes.

In order to assure that the units 1 and 2, when placed in operative relation, are properly oriented, I may provide outwardly extending bends 16 and 17 in the upper rings 3 and 10 respectively, which prevent nesting of the units 1 and 2 except when the bends 16 and 17 are aligned, and which, when aligned, enforce proper orientation of the units.

I may provide a projection (not shown) of any convenient character, and attached to the inner unit 2 at any convenient location thereon, to facilitate removal of the inner unit 2 from the outer unit 1. Provision of such a projection is for convenience only, and does not proceed to the essence of my invention.

It will further be realized that the rods 15 and/or the rings 5, may be fabricated with corrugations or slight bends (not shown) at points of cross-over, if desired. This is not, however, essential to my invention, and is, in fact, not perferred, since construction of this character may add measurably to the cost of manufacture of the device. On the other hand, construction of this character tends to formation of a more perfect mesh, and a more rigid structure, when the units 1 and 2 are placed in complementary relation, the one within the other, which may, in some fields of utilization of the invention, justify the increase in cost of manufacture.

While I have described and illustrated one specific embodiment of my invention, and have suggested certain modifications thereof, it will be realized that still further modifications of the general arrangement, and/or of its details, may be resorted to without departing from the true scope and spirit of the invention, which is defined in the appended claim.

What I claim and desire to secure by Letters Patent of the United States is:

As an article of manufacture, a strainer and sifter comprising a first right cylindrical unit, a second conjoinable right cylindrical unit adapted to fit snugly within said first right cylindrical unit, said units being open at one end, the other end of each of said units being formed of a plurality of parallel elongated elements, means forming the cylindrical surface of one of said units of parallel elongated elements running peripherally of the cylindrical surface thereof, means forming the cylindrical surface of the other of said units of parallel elongated elements running along generating elements of said cylindrical surface of the other of said elements, and means enforcing mutual orientation of said units, when conjoined, with the elongated elements forming the ends of said units in mutually perpendicular relation.

JOSEPH PEARLSTEIN.

References Cited in the file of this patent

UNITED STATES PATENTS

| Number | Name | Date |
| --- | --- | --- |
| 37,454 | Maxam | Jan. 20, 1863 |
| 265,635 | Raughtigan et al. | Oct. 10, 1882 |
| 590,902 | Nearing | Sept. 28, 1897 |
| 682,515 | Allard | Sept. 10, 1901 |
| 744,060 | Frye | Nov. 17, 1903 |
| 916,041 | Shepherd | Mar. 23, 1909 |
| 1,137,266 | James | Apr. 27, 1915 |
| 1,137,480 | Gwynn | Apr. 27, 1915 |
| 1,371,143 | Bradburn | Mar. 8, 1921 |
| 2,042,537 | Liddell | June 2, 1936 |
| 2,271,662 | Rubissow | Feb. 3, 1942 |

FOREIGN PATENTS

| Number | Country | Date |
| --- | --- | --- |
| 584,167 | Germany | Sept. 15, 1933 |